United States Patent [19]

Burklund

[11] Patent Number: 5,449,031
[45] Date of Patent: Sep. 12, 1995

[54] TIRE SUPPORT AND SAFETY CAGE APPARATUS AND METHOD

[76] Inventor: Fred A. Burklund, 5627 Oak Hills Dr., Omaha, Nebr. 68137

[21] Appl. No.: 209,406

[22] Filed: Mar. 14, 1994

[51] Int. Cl.$^6$ .................. B60C 25/00; B60B 30/00
[52] U.S. Cl. ................................. 157/1.0; 414/463
[58] Field of Search ............... 157/1.0; 414/462, 463, 414/465, 464

[56] References Cited

U.S. PATENT DOCUMENTS

| | | | |
|---|---|---|---|
| 3,405,665 | 10/1968 | Slonim | 108/55 |
| 3,687,442 | 8/1972 | Goff | 157/1 |
| 3,734,239 | 5/1973 | Martin et al. | 187/9 |
| 3,828,953 | 8/1974 | Reznicek | 214/332 |
| 3,850,295 | 11/1974 | Black | 206/304 |
| 4,036,274 | 7/1977 | Peel, Sr. | 157/1 |
| 4,381,027 | 4/1983 | Molen et al. | 157/1 |
| 4,538,659 | 9/1985 | Adelman et al. | 157/1 |
| 4,597,711 | 7/1986 | Liebermann | 414/427 |
| 4,609,025 | 9/1986 | Messenger | 157/1 |
| 4,865,104 | 9/1989 | Mannen | 157/1 |
| 4,901,650 | 2/1990 | Armstead | 108/55.1 |
| 5,228,821 | 7/1993 | Gleffe et al. | 414/403 |

Primary Examiner—D. S. Meislin
Attorney, Agent, or Firm—John A. Beehner

[57] ABSTRACT

The invention is directed to a tire support and safety cage for mounting on a vehicle lift gate or the like. The invention has a base frame for mounting the tire support and safety cage to a lift gate, inner and outer pairs of support members, each support member having top and bottom end portions, the bottom end portions being pivotally mounted to the base frame such that the support members are pivotally movable between raised working positions and lowered storage positions. A securement bar is connected to and extended between the top end portions of one of the pairs of support members. A closure frame is pivotally connected to the top end portions of the other of the pairs of support members for movement between a generally horizontal lowered locking position and a generally vertical raised open position. A means is included for releasably securing the closure frame, in the lowered locking position, relative to the securement bar and the one pair of support members. Upon pivotal movement of the inner and outer pairs of support members to the raised working positions, the inner and outer support members and closure frame form a cage for supporting and partially enclosing a tire therein. One of the pairs of support members is nestable within the other of the pairs of support members in the lowered storage positions thereof whereby the height of the nested inner and outer pairs of support members is less than the combined heights of the inner and outer pairs of support members in the lowered storage positions thereof.

12 Claims, 6 Drawing Sheets

TIRE SUPPORT AND SAFETY CAGE APPARATUS AND METHOD

BACKGROUND OF THE INVENTION

1. Technical Field

The method and apparatus of this invention relate generally to tire operations. More specifically, it relates to an apparatus and method for assisting in the lifting of tires onto and off of a truck bed and for providing a safety cage during the inflation of tires.

Currently, separate pieces of equipment are required for providing a means of retaining tires while being placed onto or removed from a truck bed and for providing the safety cage feature required by the Environmental Protection Agency during inflation of tires. Consequently, there is a need for a single piece of equipment which may perform both functions and yet be capable of compact storage when the device is not in use.

2. Description of the Prior Art

Prior art devices for retaining tires in a stationary position while being loaded onto or from truck beds and devices for providing the required safety cage feature during inflation are well known in the art. However, prior to the present invention, two separate pieces of equipment were required to perform these two functions.

In one common prior art device, front and back inverted V-shaped channels spanning the width of a truck lift gate are secured thereto. A large pivotal U-shaped support arm is hinged at one end of the lift gate and pivots from the horizontal to a substantially vertical, over-center position. For the loading/unloading function, the U-shaped support arm is pivoted upward to the over-center position. Tires are then placed against the U-shaped support arm such that the tire rests against the U-shaped support arm and is prevented from rolling forward and backward by the inverted V-shaped channels. A major disadvantage with this configuration, is that the U-shaped support arm does not fold down into the inverted V-shaped channels. Consequently, the operator must step over a double height obstruction in order to get into and out of the truck bed. Additionally, with this type of a prior art configuration, an additional separate piece of safety equipment is required.

The Environmental Protection Agency regulations require that a tire-servicing truck be equipped with a safety cage for use during inflation of tires. The purpose of such a safety cage is to prevent injury to the operator in the event that a tire would explode during the inflation operation. A conventional configuration for such a safety cage is two U-shaped halves pivotally connected by means of a hinge at the top of the halves. This additional piece of equipment must then be stored separately in the bed of the truck with the obvious disadvantage that the safety cage takes up additional valuable space in the bed of the truck. Additionally, the safety cage must be removed and replaced from the bed of the truck each time a tire is to be inflated. This difficult task is made doubly difficult by the aforementioned fact that the U-shaped support arm folded onto the V-shaped channels presents a doubly high barrier for the operator to climb over when getting into and out of the truck bed.

Additional examples of prior art tire handling devices are provided in the Black U.S. Pat. No. 3,850,295 and Slonim U.S. Pat. No. 3,405,665. Black discloses a tire shipping and storage structure for maintaining one or more stacks of tires in compressed mode during shipping and storage. Slonim discloses a shipping palett also for use in shipping and transporting or storing goods. Neither Black nor Slonim makes any mention of use on a truck bed for facilitating the placing of tires into the truck bed or removing them therefrom. Additionally, there is no indication that the units may be compactly stowed during periods of non-use nor that the devices may be used for the EPA-mandated safety cage during the inflation process.

Therefore, a primary objective of the present invention is to provide an apparatus which may function as both the mandated safety cage and as a support apparatus facilitating the loading and removal of tires onto and from a truck bed.

Another objective of the present invention is to provide a tire support apparatus which is capable of being compactly stored when not in use.

Another objective of the present invention is to provide a safety cage apparatus which is capable of protecting the operator and preventing injury in the event of an explosion during inflation, as required by the Environmental Protection Agency rules.

Another objective of the present invention is to provide a combination safety cage and tire support apparatus which may be easily and quickly converted from the safety cage mode of operation to the tire support mode of operation.

Another objective of the present invention is to provide a combination safety cage and tire support apparatus which may be used on any truck lift gate.

Another objective of the present invention is to provide a combination safety cage and tire support apparatus which may be secured to the lift gate of a vehicle thereby preventing the apparatus from being left at the job site.

Another objective of the present invention is to provide a combination safety cage and tire support apparatus capable of being adjusted in size to accommodate tires of various sizes.

Another objective of the present invention is to provide a combination safety cage and tire support apparatus having locking means for locking the apparatus into the proper position.

SUMMARY OF THE INVENTION

The invention is directed to a tire support and safety cage for mounting on a vehicle lift gate or the like. The invention has a base frame for mounting the tire support and safety cage to a lift gate, inner and outer pairs of support members, each support member having top and bottom end portions, the bottom end portions being pivotally mounted to the base frame such that the support members are pivotally movable between raised working positions and lowered storage positions. A securement bar is connected to and extended between the top end portions of one of the pairs of support members. A closure frame is pivotally connected to the top end portions of the other of the pairs of support members for movement between a generally horizontal lowered locking position and a generally vertical raised open position. A means is included for releasably securing the closure frame, in the lowered locking position, relative to the securement bar and the one pair of support members. Upon pivotal movement of the inner and outer pairs of support members to the raised working positions, the inner and outer support members and closure frame form a cage for supporting and partially enclosing a tire therein. One of the pairs of support members is nestable within the other of the pairs of support members in the lowered storage positions thereof whereby the height of the nested inner and outer pairs of support members is less than the combined heights of the inner and outer pairs of support members in the lowered storage positions thereof.

DESCRIPTION OF THE PREFERRED EMBODIMENT

Figure 1:
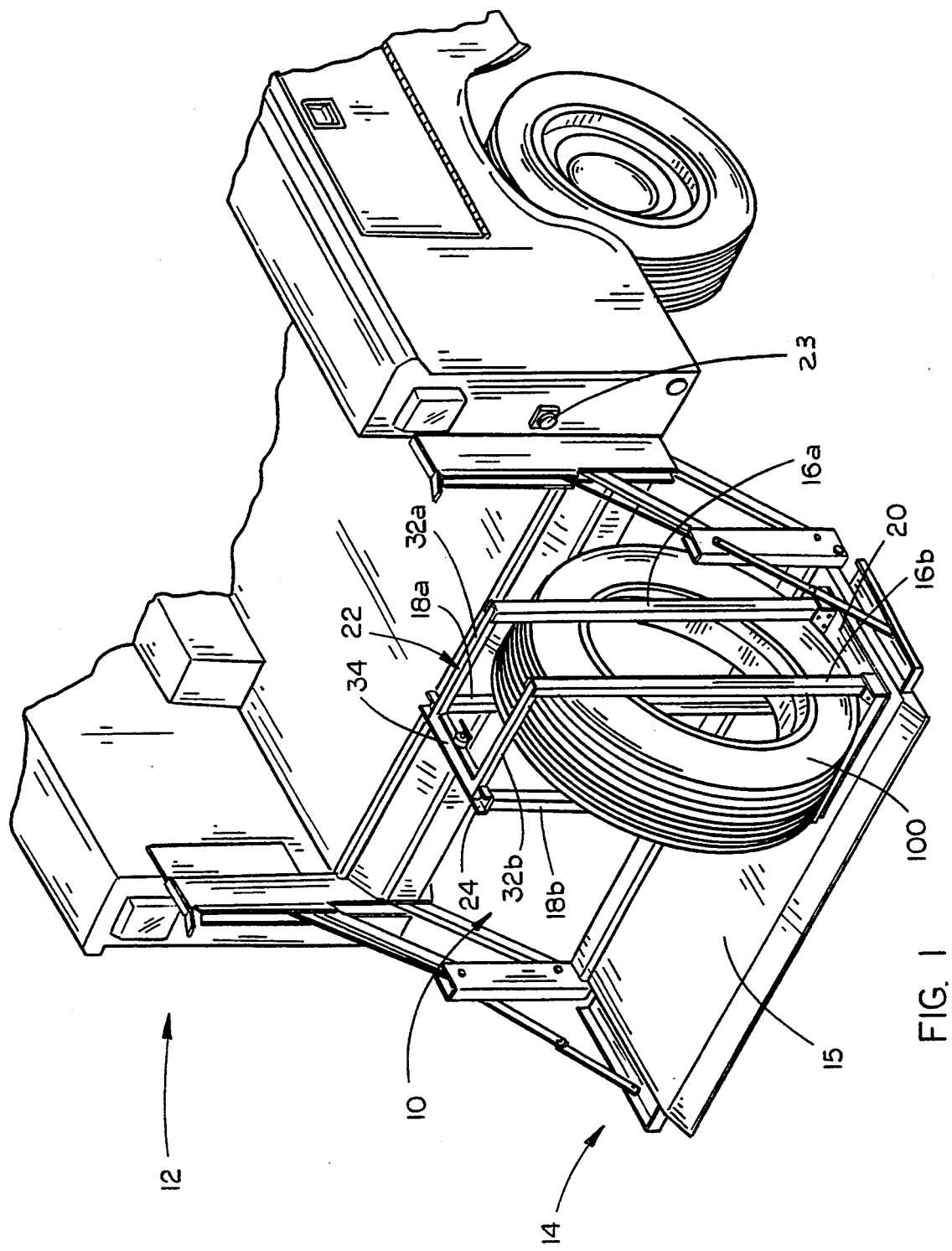
FIG. 1 is a foreshortened perspective view of the invention installed on the automatic lift gate of a truck with the cage apparatus raised to support a tire therein.

The tire support and safety cage apparatus of the present invention is shown installed and in a working configuration in FIG. 1. As shown in the figure, the apparatus 10 is installed on bed 15 of lift gate 14 at substantially one end of the lift gate 14. In the preferred embodiment and as shown in the figure, the apparatus be is installed on the right side of lift gate 14. The purpose for the preferred, right side installation is operator safety. Installation on the right side keeps the operator on the right side of the truck 12 and away from traffic, presumably passing by on the left. Additionally, right side installation increases proximity to air fill valve 23 on truck 12. Although the preferred installation is on the right side, the apparatus is equally adapted for installation on the left. This alternative installation is represented in FIGS. 2-9 and the two embodiments operate in the same manner.

Figure 6:
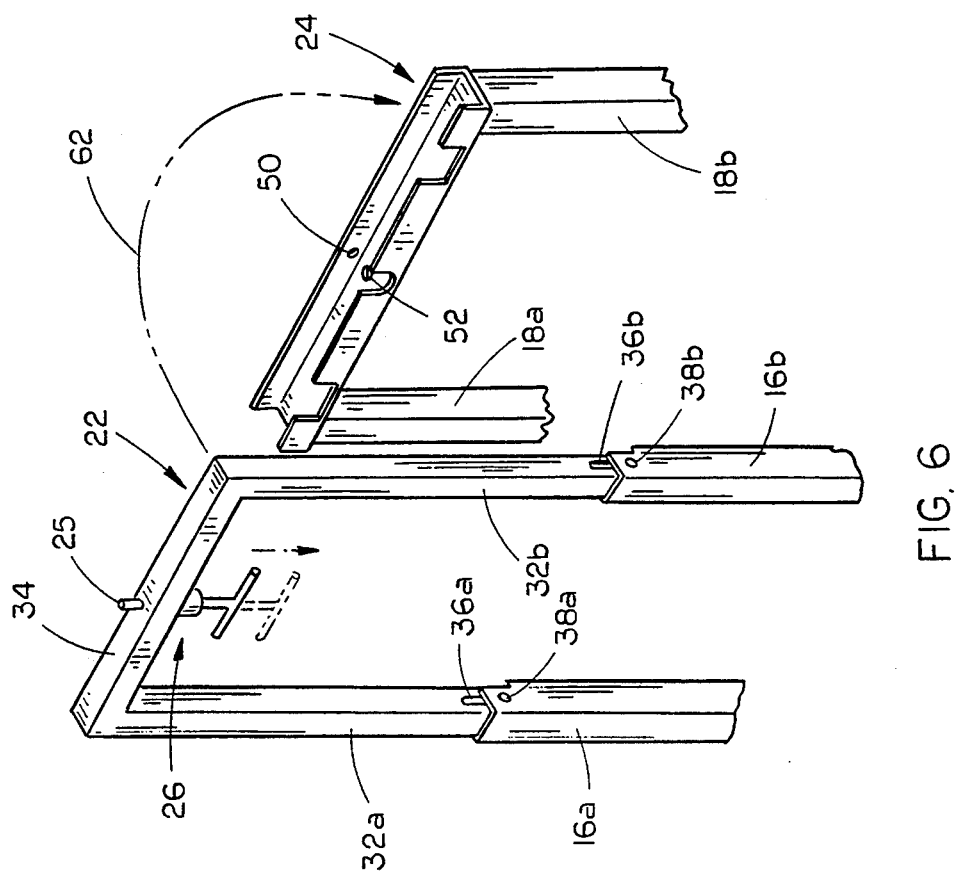
FIG. 6 is a partial perspective view of the top portion of the cage apparatus showing how the top portion is received in the open topped channel of one side of the cage.

In the figure, support members 16a and b and 18a and b are shown in the upright working position. Closure frame 22 is shown releasably secured in the lowered locking position relative to securement bar 24. First closure frame arm 32a and second closure frame arm 32b are shown pivotally connected to first and second support members 16a and b, respectively. The pivotal connection of closure frame 22 and first and second support members 16a and b allows closure frame 22 to be pivoted between a lowered locking position as shown in FIG. 1 and a raised, open position as shown in FIG. 6. As shown in FIG. 1, tire 100 is installed in the tire cage between support members 16a and 16b and 18a and 18b. Tire 100 is also restrained by means of base means 20 and closure frame 22. As shown in the figure, base means 20 may be a plate. Alternatively, base means 20 could be any one of numerous cross-strips or similar configurations. Yet another alternative would be to connect mounting bars 30a and 30b directly to bed 15. An air supply is provided on truck 12 by valve 23 for inflating of tire 100. In the configuration shown in FIG. 1, the apparatus 10 is configured for the safety cage mode of operation and satisfying rules mandated by the Environmental Protection Agency (EPA). In the safety cage mode of operation, the EPA requires that the tire be restrained by a cage apparatus to reduce the chance for operator injury during tire inflation and servicing.

Figure 2:
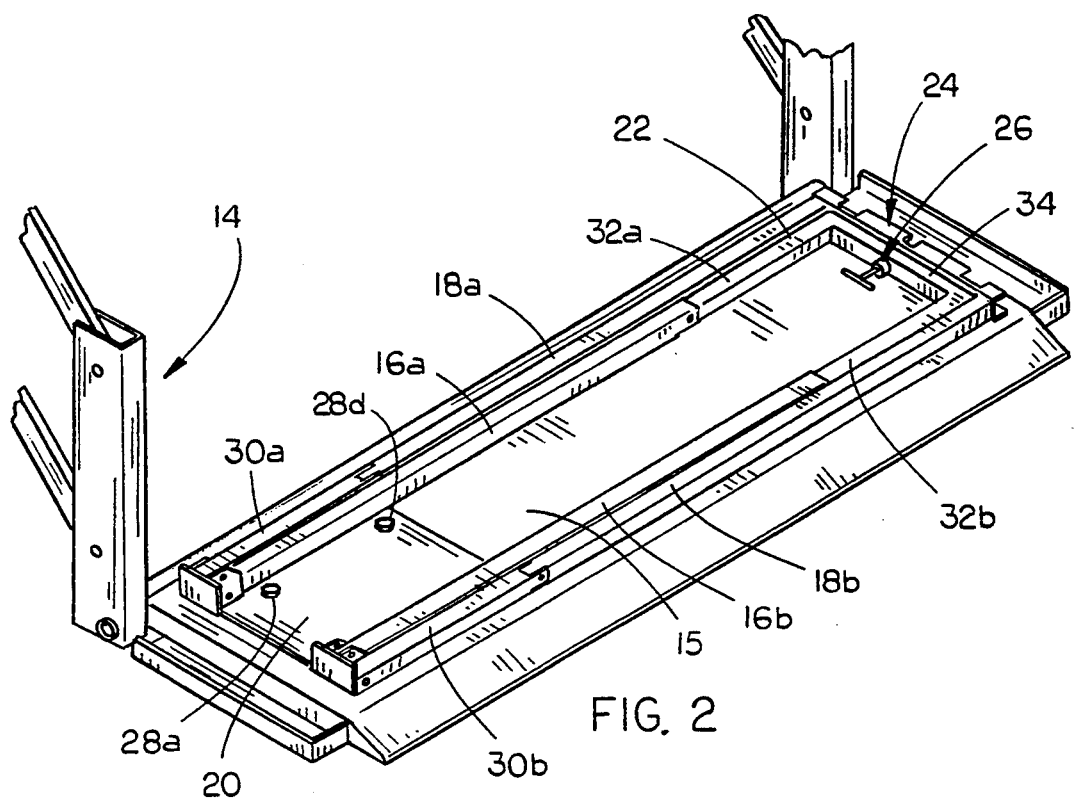
FIG. 2 is a perspective view of the invention in its lowered storage position on an automatic lift gate.

An important feature of the present invention, namely its low-profile storage feature, is illustrated in FIG. 2. FIG. 2 also illustrates the alternative left side installation. However, both the preferred and alternative installations function equivalently. As shown in the figure, the entire safety cage/tire support apparatus may be collapsed into a single layer on the bed 15 of liftgate 14. As shown in the figure, support members 16a and b as well as closure frame 22 may be collapsed such that they nest within the framework provided by support members 18a and 18b and securement bar 24 when the tire support/safety cage apparatus is pivoted downward to its storage position shown in the figure. Details of how the frame is collapsed into the storage configuration are discussed in conjunction with FIG. 4 below. As can be seen in FIG. 2, the support members 16a and 16b are mounted to base plate 20 interiorly of base plate mounting bars 30a and b such that when the support members 16a and 16b are pivoted downward they maintain an interior, nesting position relationship to support members 18a and 18b respectively. Additionally, securement bar 24 in conjunction with locking pin 26 provides a means for locking the entire tire support/safety cage apparatus 10 into the storage position by providing a first engagement hole 50 (FIG. 6) for locking pin 26 to engage. Further, locking of the apparatus is accomplished using locking means 40 (FIG. 5) as described in more detail below.

Figure 3:
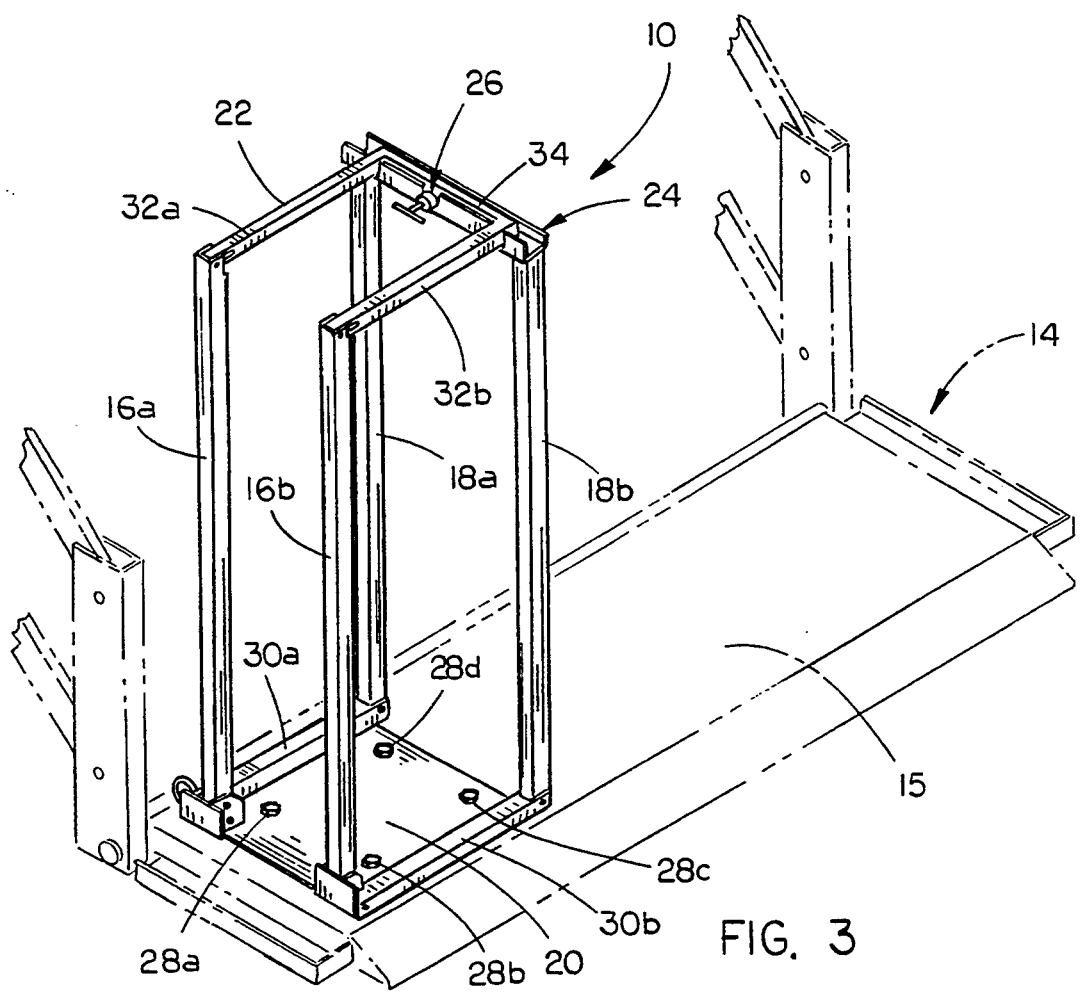
FIG. 3 is a perspective view of the invention on the automatic lift gate of a truck but with the cage apparatus in a raised working position.

FIG. 3 shows the raised working configuration as also illustrated in FIG. 1 with the tire removed therefrom to more particularly illustrate the physical interconnection of various components of the apparatus 10. As can be more easily seen in the figure, support members 16a and b are mounted to base plate 20 interiorly of base plate mounting bars 30a and 30b respectively. This allows support members 16a and 16b to be pivoted downward to the lowered storage position while maintaining an interiorly adjacent relation between the support members 16a and b and base plate mounting bars 30a and b and support members 18a and b respectively. This allows members 16a and b and 18a and b to nest, thereby decreasing the storage profile as shown in FIG. 2.

Figure 4:
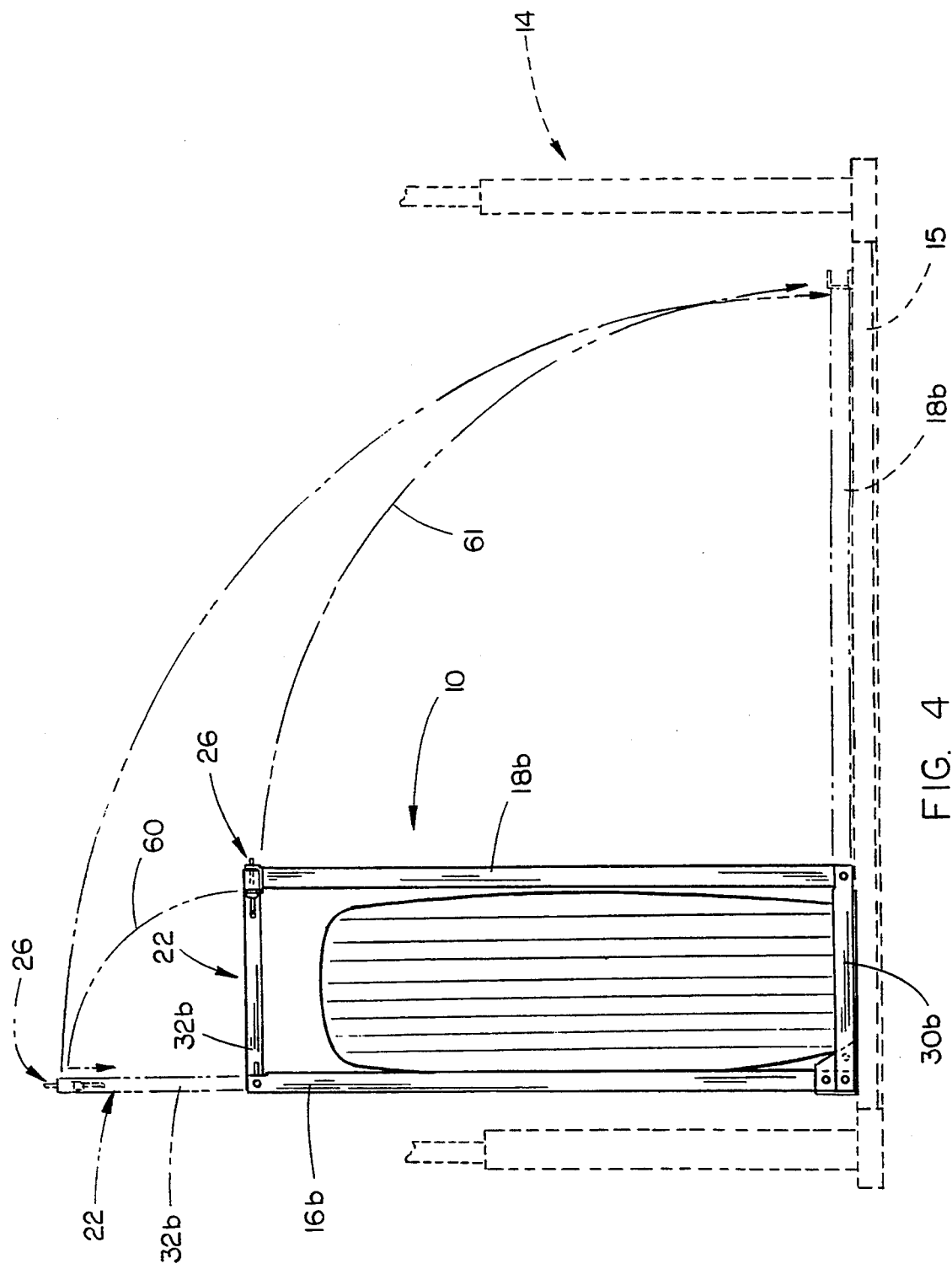
FIG. 4 is an end view of the invention with the alternate positions for the cage members indicated in dotted lines.

FIG. 4 is an end view of the apparatus 10 mounted on a lift gate 14 shown in dotted lines. Additionally, the closure frame 22 is shown in its lowered locking position as well as in the raised open position shown in dotted lines. Still further, the support member 18b is shown in its lowered storage position in dotted lines. As shown in the figure, tire 100 is installed in the cage apparatus between the support member 16b, 15b, base plate 20 (not shown) and closure frame 22. This configuration is required by the EPA during tire inflation and servicing to minimize the potential for operator injury when the tire is being serviced. The movement arc 60 shown in FIG. 4 illustrates quite clearly the pivoting of the closure frame 22 from the lowered locking position shown in dotted lines, to the raised open position indicated in solid lines. Also shown by the terminating end of arc 60 is the locking feature wherein the closure frame 22 may be locked in the raised open position. This feature is described in more detail below in conjunction with FIG. 5. Also clearly illustrated by arc 61 is the movement of the support member 18b from the raised working position to the lowered storage position.

Figure 5:
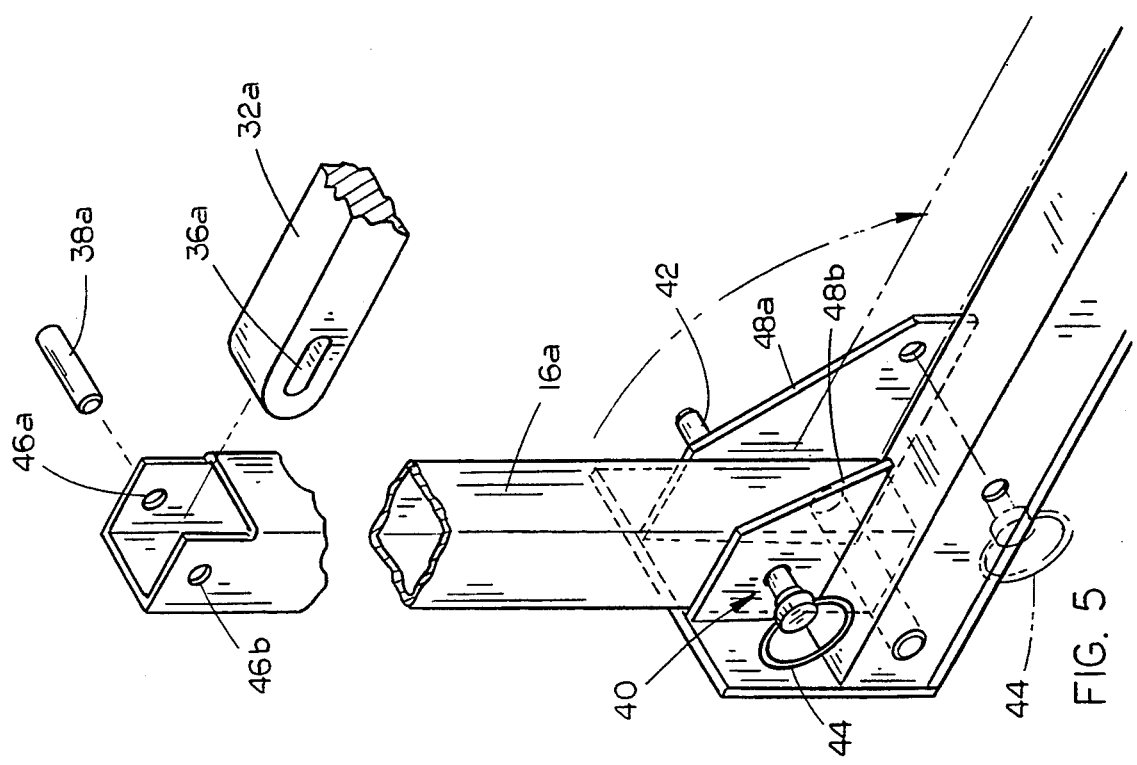
FIG. 5 is a partially exploded foreshortened perspective view showing the pinned pivotal connection of a support arm to the base to the slotted pinned pivotal connection of a cage top cross member to the support arm.

FIGS. 5 and 6 are detailed views showing the connection of the closure frame 22 to support members 16a and b and the engagement of closure frame 22 with securement bar 24 respectively. Also shown in FIG. 5 is the locking means 40 for locking the support member 16a into the raised working position or lowered storage position, shown in dotted lines in the figure. Locking means 40 allows the entire tire support/safety cage apparatus to be locked into one of the two desired positions preventing the apparatus from being inadvertently moved from one position to the other. Locking means 40 comprises pin 42 and release handle 44. Locking of support member 16a into either the raised or lowered positions entails simply insertion of the pin 42 through holes in the mounting brackets 48a and 48b and into support member 16a thereby preventing movement of the support member from the position. Locking means 40 is shown installed on support member 16a but may alternatively be installed on support member 16b at the option of the user.

As shown in FIG. 5, closure frame arm 32a is mounted to support member 16a by means of attachment pin 38a and slot 36a. Closure frame arm 32a is inserted into the top of support member 16a and pin 38a is slidably inserted through holes 46a and b and slot 36a thereby retaining closure frame arm 32a in support member 16a. Slot 36a and closure frame arm 32a allow closure frame 22 to pivot relative to support member 16a and to be moved relative to support member 16a. Slot 36a and closure frame arm 32a in conjunction with pin 38 provide a means for locking closure frame 22 into the raised open position. Locking is accomplished by the closure frame 22 being gravitationally urged in the downward direction when raised to the raised open position, thereby causing arms 32a and b into the downward position such that pin 38a rests along the uppermost portion of slot 36a. This prevents the arm from being pivoted since the lower portion of arm 32a is urged against the back of support member 16a preventing arm 32a and thus the closure frame 22 from pivoting out of position inadvertently.

As shown in FIG. 6, when the closure frame 22 is to be moved from the raised open position to the lowered locking position, the closure frame 22 is first raised vertically to provide sufficient clearance for the closure frame arms 32a and b to be pivoted about locking pins 38a and b. Closure frame 22 is then pivoted downward as shown by the dotted arc 62 and into locking engagement with securement bar 24. Locking means 26 in conjunction with engagement hole 50 provides a means for locking the closure frame 22 into the lowered locking position. Once the closure frame 22 has been lowered to the locking position, hole 50 may receive pin 25 therein, thereby locking frame 22 into position. Additionally, locking means 26 in conjunction with second engagement hole 52 provides for locking of the apparatus in the lowered storage position. The position of second engagement hole 52 on the underside of the securement bar 24 causes the hole 52 to be placed in a position whereby locking pin 27 may be inserted therein when the apparatus 10 is pivoted downward into the storage position (FIG. 2).

Figure 7:
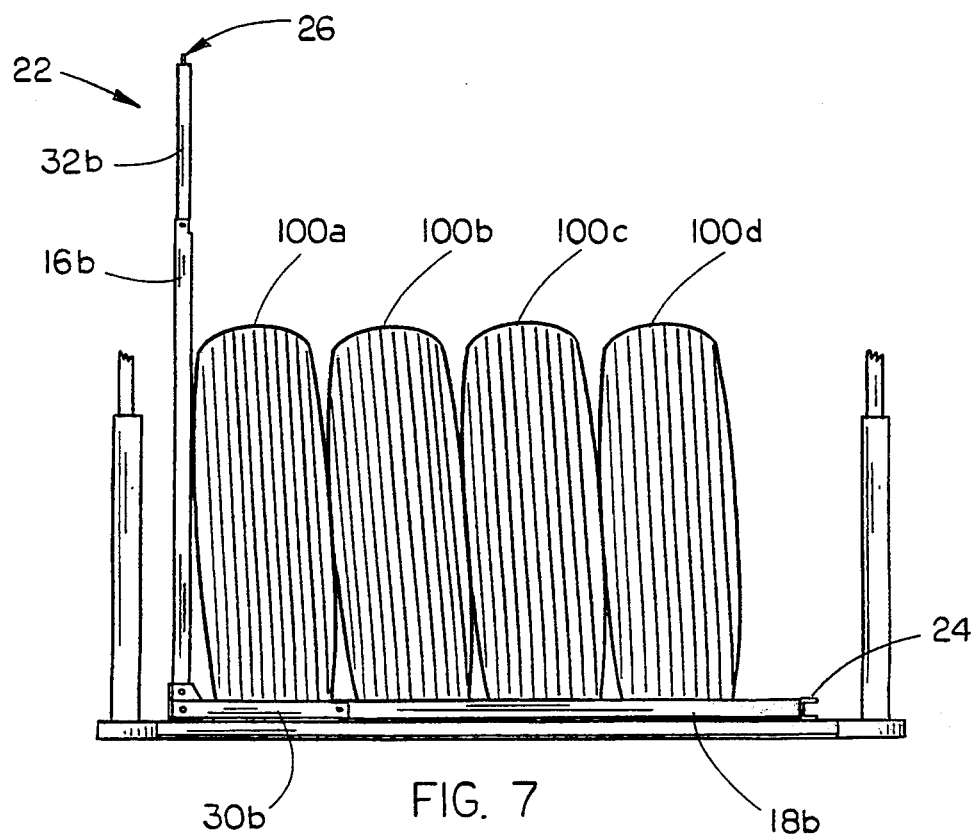
FIG. 7 is a front elevational view of the invention with the support arm in a raised position and the opposite cage side member in the lowered position for retaining tires on the lift gate.

FIG. 7 is an end view showing the tire support/safety cage apparatus of the present invention being utilized in the tire support configuration. As shown in the figure, tires 100a-d are supported on the truck lift gate bed for lifting by the lift gate either onto or off of the truck. In this configuration, support members 18a and b are placed in the lowered storage position while support members 16a and b are locked into the raised working position. Additionally, closure frame 22 is in the raised open position and locked as described earlier. The lowered support members 18a and b in conjunction with base plate mounting bars 30a and b provide a barrier preventing the tires from rolling forward or backward while on the lift gate and being moved onto or off of the truck.

Figure 8:
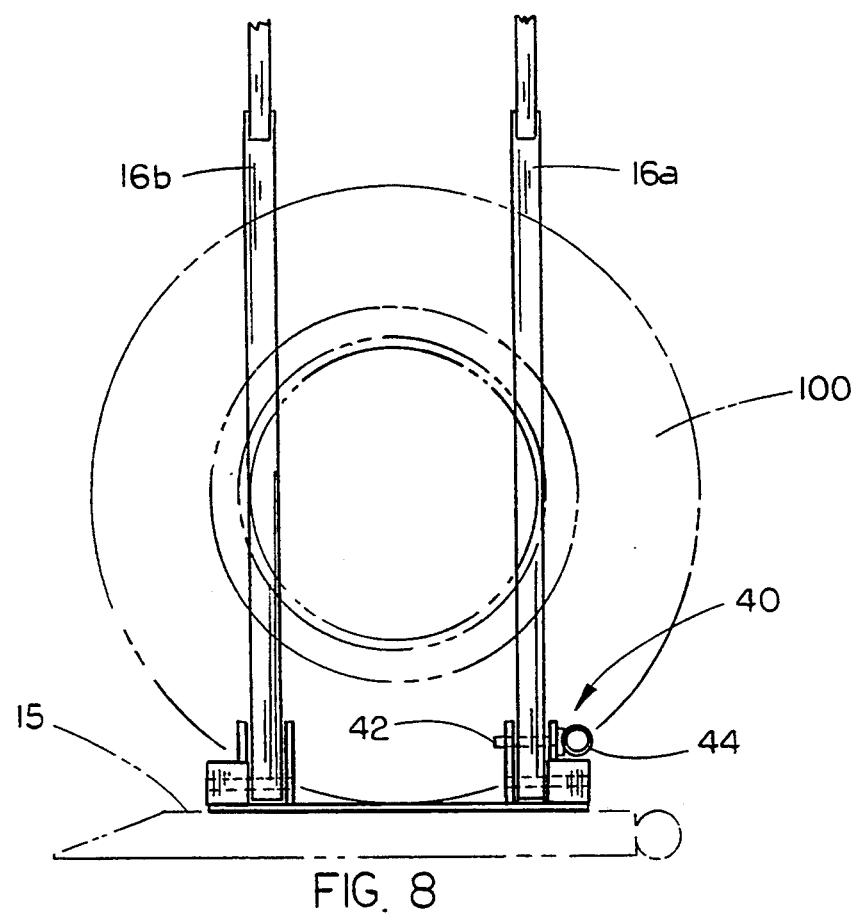
FIG. 8 is a foreshortened side elevational view of the tire support frame locked in its raised position with a tire indicated in dotted lines thereon.

FIG. 8 is an end view showing the tire support/safety cage apparatus in the tire support mode of operation again showing the support members 16a and b and closure frame 22 in the raised positions and additionally showing the locking means 40 for locking the support member 16a into the raised position. Locking support member 16a into the raised working position is operative to also lock support member 16b in the raised position since support members 16a and b are connected by means of the closure frame 22.

Figure 9:
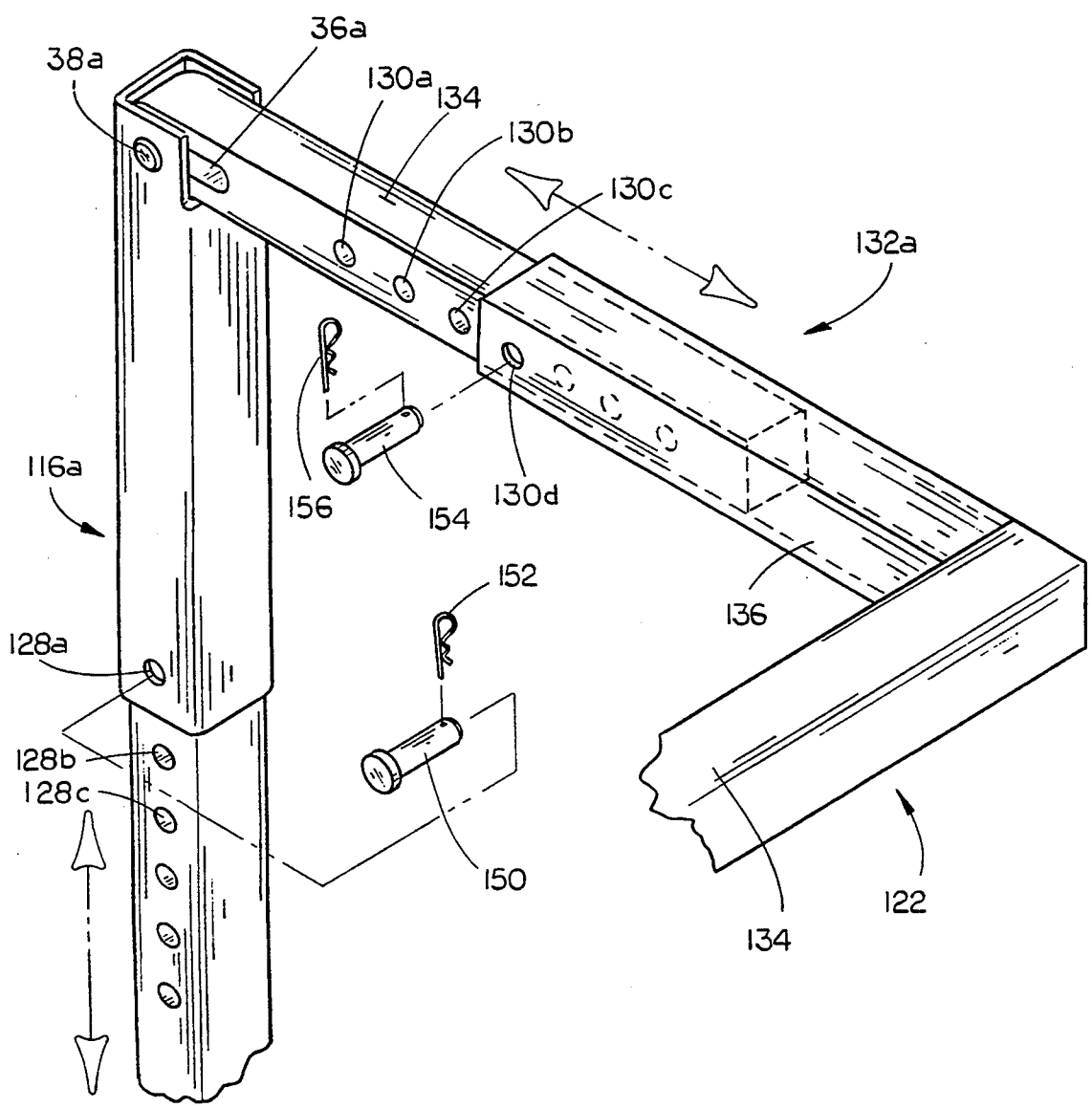
FIG. 9 is a foreshortened perspective view of an alternate embodiment of the invention wherein both the tire support arm and top cross bar of the cage are length-adjustable to accommodate various sizes of tires.

FIG. 9 is an alternative embodiment wherein adjustment means have been provided for adjusting the length of support members 116a and b and 118a and b and for adjusting the reach of closure frame 122. Adjustment of the support members 116a and b and 118a and b is made by separating each of support members 116a and b and 118a and b into two overlapping pieces. A plurality of locking holes such as 128a, b, c are then provided in the overlapping portion of each of the members. A locking pin 150 and associated cotter pin 152 are provided for insertion into the proper hole corresponding to the desired length of the member. Similarly, reach adjustment of the closure frame 122 is allowed by subdividing arms 132a and b into two separate, overlapping pieces and providing adjustment holes such as 130a, b, c therein. A locking pin 154 and associated cotter pin 156 may then be inserted into the proper hole maintaining the proper reach. Obviously, means other than locking pins 150, 154 may be used for locking the support members and closure frame into position, such as frictional engagements and the like.

It is obvious that numerous other modifications and variations of the present invention are possible in view of the above teachings. For example, an important modification previously mentioned is to incorporate a means of adjusting the height of the support members and the reach of the closure frame. This would allow for adjustments to accommodate tires of differing sizes. Additionally, numerous base plate designs might be used to accommodate lift gates of differing designs.

Therefore, it is to be understood that the above description is intended in no way to limit the scope of protection of the claims and is representative only of the several possible embodiments of the present invention.

There has thus been shown and described an invention which accomplishes at least all of the stated objects.

I claim:

1. A tire support and safety cage for mounting on a vehicle lift gate or the like, comprising:

base frame means for mounting said tire support and safety cage to a lift gate, inner and outer pairs of support members, each support member having top and bottom end portions, said bottom end portions being pivotally mounted to said base frame such that said support members are pivotally movable between raised working positions and lowered storage positions;

a securement bar connected to and extended between said top end portions of one of said pairs of support members;

a closure frame pivotally connected to said top end portions of the other of said pairs of support members for movement between a generally horizontal lowered locking position and a generally vertical raised open position;

means for releasably securing said closure frame, in the lowered locking position thereof, relative to said securement bar and said one pair of support members, upon pivotal movement of said inner and outer pairs of support members to the raised working positions thereof, whereby said inner and outer support members and closure frame form a cage for supporting and partially enclosing a tire therein, and one of said pairs of support members being nestable within the other of said pairs of support members in the lowered storage positions thereof whereby the height of said nested inner and outer pairs of support members is less than the combined heights of said inner and outer pairs of support members in the lowered storage positions thereof.

2. The invention of claim 1 wherein said securement bar is connected to said inner pairs of support members and said closure frame is connected to said outer pairs of support members.

3. The invention of claim 1 wherein said inner support members are nestable within said outer support members.

4. The invention of claim 1 wherein said closure frame is generally U-shaped.

5. The invention of claim 1 further comprising closure frame locking means for locking said closure frame into said raised working position.

6. The invention of claim 1 further comprising support member locking means for releasably locking said support members into said raised working position or into said lowered storage position.

7. The invention of claim 1 wherein the length of said support members is adjustable.

8. The invention of claim 1 wherein the length of said closure frame is adjustable.

9. A tire support and safety cage for mounting on a vehicle lift gate or the like, comprising:

base frame means for mounting said tire support and safety cage to a lift gate, inner and outer pairs of support members, each support member having top and bottom end portions, said bottom end portions being pivotally mounted to said base frame such that said support members are pivotally movable between raised working positions and lowered storage positions;

a securement bar connected to and extended between said top end portions of one of said pairs of support members;

a closure frame pivotally connected to said top end portions of the other of said pairs of support members for movement between a generally horizontal lowered locking position and a generally vertical raised open position; and means for releasably securing said closure frame, in the lowered locking position thereof, relative to said securement bar and said one pair of support members, upon pivotal movement of said inner and outer pairs of support members to the raised working positions thereof, whereby said inner and outer support members and closure frame form a cage for supporting and partially enclosing a tire therein.

10. A method of moving and inflating a tire comprising:

providing a tire support and safety cage apparatus having, base frame means for mounting said tire support and safety cage to a lift gate, inner and outer pairs of support members, each support member having top and bottom end portions, said bottom end portions being pivotally mounted to said base frame such that said support members are pivotally movable between raised working positions and lowered storage positions;

a securement bar connected to and extended between said top end portions of one of said pairs of support members;

a closure frame pivotally connected to said top end portions of the other of said pairs of support members for movement between a generally horizontal lowered locking position and a generally vertical raised open position;

means for releasably securing said closure frame, in the lowered locking position thereof, relative to said securement bar and said one pair of support members, upon pivotal movement of said inner and outer pairs of support members to the raised working positions thereof, whereby said inner and outer support members and closure frame form a cage for supporting and partially enclosing a tire therein;

one of said pairs of support members being nestable within the other of said pairs of support members in the lowered storage positions thereof whereby the height of said nested inner and outer pairs of support members is less than the combined heights of said inner and outer pairs of support members in the lowered storage positions thereof;

raising said inner and outer pairs of support members from said lowered storage position to said raised working position;

lowering said closure frame from said vertical raised position to said lowered locking position;

releasably securing said closure frame in the lowered locking position; and installing said tire for servicing.

11. The method of claim 10 further comprising the steps of:

removing said tire from said tire support and safety cage apparatus; releasing said closure frame from said lowered locking position;

raising said closure frame from the lowered locking position to said raised open position;

lowering said inner and outer pairs of support members from said raised working position to said lowered storage position; and nesting said inner and outer pairs of support members in said lowered storage position.

12. The method of claim 10 wherein the step of raising said inner and outer pairs of support members to the raised working position further comprises the step of locking said support members into said raised working position.

* * * * *